(12) United States Patent
Wang et al.

(10) Patent No.: US 9,791,965 B2
(45) Date of Patent: Oct. 17, 2017

(54) IN-CELL TOUCH PANEL HAVING MULTIPLE GATE LINES CROSSING A PLURALITY OF TOUCH DRIVING SUB-ELECTRODES, DRIVING METHOD THEREOF, AND DISPLAY

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Haisheng Wang, Beijing (CN); Xue Dong, Beijing (CN); Yingming Liu, Beijing (CN); Xiaoliang Ding, Beijing (CN); Shengji Yang, Beijing (CN); Tao Ren, Beijing (CN); Weijie Zhao, Beijing (CN); Hongjuan Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/894,839

(22) PCT Filed: Feb. 9, 2015

(86) PCT No.: PCT/CN2015/072560
§ 371 (c)(1),
(2) Date: Nov. 30, 2015

(87) PCT Pub. No.: WO2016/074357
PCT Pub. Date: May 19, 2016

(65) Prior Publication Data
US 2016/0291773 A1    Oct. 6, 2016

(30) Foreign Application Priority Data

Nov. 13, 2014    (CN) .......................... 2014 1 0640490

(51) Int. Cl.
*G06F 3/041*    (2006.01)
*G06F 3/044*    (2006.01)

(52) U.S. Cl.
CPC ............ *G06F 3/0416* (2013.01); *G06F 3/044* (2013.01); *G06F 3/0412* (2013.01)

(58) Field of Classification Search
CPC .................................................... G06F 3/0416
(Continued)

(56) References Cited

U.S. PATENT DOCUMENTS

2012/0105338 A1*    5/2012    Lin .................. G11C 19/28
345/173
2013/0278516 A1*   10/2013    Nagata .................... G06F 3/041
345/173

(Continued)

FOREIGN PATENT DOCUMENTS

CN    102914920 A    2/2013
CN    103150070 A    6/2013
(Continued)

OTHER PUBLICATIONS

First Office Action regarding Chinese application No. 201410640490.1, dated Dec. 5, 2016. Translation provided by Dragon Intellectual Property Law Firm.
International Search Report and Written Opinion of the International Searching Authority for international application No. PCT/CN2015/072560, dated Feb. 9, 2015.

*Primary Examiner* — Long D Pham
(74) *Attorney, Agent, or Firm* — Harness, Dickey & Pierce, P.L.C.

(57) ABSTRACT

The present disclosure provides an in-cell touch panel, its driving method and a display device. The in-cell touch panel includes a resetting signal line, display control modules and (Continued)

touch control modules. Each touch driving sub-electrode is connected to the corresponding display control module and the corresponding touch control module. The display control module is connected to gate lines crossing each touch driving sub-electrode and configured to, when driving the gate lines crossing each touch driving sub-electrode, control the touch driving sub-electrode to be connected to a common electrode line. The touch control module is connected to the resetting signal line and configured to, after all the gate lines crossing each touch driving sub-electrode have been driven, control the touch driving sub-electrode to be connected to the touch driving signal line through a resetting signal from the resetting signal line.

16 Claims, 4 Drawing Sheets

(58) Field of Classification Search
USPC .......................................................... 345/173
See application file for complete search history.

(56) References Cited

U.S. PATENT DOCUMENTS

| 2013/0314342 | A1* | 11/2013 | Kim ........................ G06F 3/041 |
| | | | 345/173 |
| 2014/0285466 | A1 | 9/2014 | Hayashi |
| 2014/0292709 | A1* | 10/2014 | Mizuhashi ............ G06F 3/0416 |
| | | | 345/174 |

FOREIGN PATENT DOCUMENTS

| CN | 103226412 A | 7/2013 |
| CN | 103257769 A | 8/2013 |
| CN | 103593083 A | 2/2014 |
| CN | 103838430 A | 6/2014 |
| CN | 103955309 A | 7/2014 |
| CN | 104102402 A | 10/2014 |
| CN | 104317456 A | 1/2015 |
| CN | 204102108 U | 1/2015 |
| CN | 204129705 U | 1/2015 |

* cited by examiner

IN-CELL TOUCH PANEL HAVING MULTIPLE GATE LINES CROSSING A PLURALITY OF TOUCH DRIVING SUB-ELECTRODES, DRIVING METHOD THEREOF, AND DISPLAY

CROSS-REFERENCE TO RELATED APPLICATION

The present application is the U.S. national phase of PCT Application No. PCT/CN2015/072560 filed on Feb. 9, 2015, which claims a priority of the Chinese patent application No.201410640490.1 filed on Nov. 13, 2014, which is incorporated herein by reference in its entirety.

TECHNICAL FIELD

The present disclosure relates to the field of display technology, in particular to an in-cell touch panel, its driving method and a display device.

BACKGROUND

For an existing in-cell touch panel, touch driving electrodes and touch sensing electrodes are arranged within a cell of a liquid crystal display (LCD). To be specific, an entire indium tin oxide (ITO) layer having a common electrode voltage Vcom is divided into two parts, one serving as common electrodes, and the other being multiplexed as common electrodes and the touch driving electrodes. Each touch sensing electrode is arranged at a horizontal black matrix (BM) region on a color filter substrate corresponding to the ITO layer.

The existing in-cell touch panel includes a plurality of gate lines arranged horizontally, a plurality of touch driving electrodes arranged longitudinally, and common electrodes. Each touch driving electrode includes a plurality of touch driving sub-electrodes arranged longitudinally, and each common electrode is located between two adjacent rows of the touch driving sub-electrodes. Each touch driving sub-electrode and each common electrode cross P gate lines, and P is a positive integer. The plurality of touch driving sub-electrodes of each touch driving electrode are connected in series to each other, and connected to a corresponding touch driving signal line. In addition, all the common electrodes of the existing in-cell touch panel are connected to a common electrode line (Vcom line).

Referring to FIG. 1, which is a sequence diagram of the existing in-cell touch panel for achieving an image display function and a touch function, the existing in-cell touch panel is driven in a time-division manner.

In FIG. 1, V-sync represents a sequence signal. To be specific, the existing in-cell touch panel includes n gate lines, e.g., gate line 1 (Gate 1), gate line 2 (Gate 2), . . . , gate line m (Gate m), gate line m+1 (Gate m+1), gate line m+2 (Gate m+2), gate line m+3 (Gate m+3), . . . , gate line n−1 (Gate n−1) and gate line n (Gate n), data lines Data, the touch driving electrodes Tx (T1, T2, . . . , Tn), and the touch sensing electrodes Rx (R1, R2, . . . , Rm). m and n are both positive integers.

In FIG. 1, in a first time period of 12.7 ms within one frame, a gate voltage is applied onto the gate lines sequentially, a data signal is applied to the data lines sequentially, and a constant voltage (a common electrode voltage) is applied to the common electrodes (including the touch driving electrodes that are multiplexed as the common electrodes) sequentially, so as to display an image. In a last time period of 4 ms within the frame, a low level signal is applied to the gate lines and the data lines so as to turn off thin film transistors (TFTs) connected to the gate lines. In addition, a corresponding touch driving voltage is applied to the multiplexed touch driving electrodes sequentially, and the constant voltage is applied to the touch sensing electrodes. At this time, an electric field is generated between the touch sensing electrodes with the constant voltage and the touch driving electrodes with the touch driving voltage, so as to achieve the touch function. The display driving and the touch driving are performed by the existing in-cell touch panel in a time-division manner within one frame, so the time for the touch driving is limited and a touch response speed is low.

SUMMARY

A main object of the present disclosure is to provide an in-cell touch panel, its driving method and a display device, so as to improve a touch response speed.

In one aspect, the present disclosure provides in one embodiment an in-cell touch panel, including a plurality of gate lines arranged in a first direction, a plurality of touch driving electrodes arranged in a second direction, a plurality of touch driving signal lines and a plurality of common electrode lines. Each touch driving electrode includes a plurality of touch driving sub-electrodes. The touch driving sub-electrode crosses multiple gate lines. The in-cell touch panel further includes a resetting signal line, display control modules and touch control modules. Each touch driving sub-electrode is connected to the display control module and the touch control module. The display control module is connected to gate lines crossing each touch driving sub-electrode and configured to, when driving the gate lines crossing each touch driving sub-electrode, control the touch driving sub-electrode to be connected to the common electrode line. The touch control module is connected to the resetting signal line and configured to, after all the gate lines crossing each touch driving sub-electrode have been driven, control the touch driving sub-electrode to be connected to the touch driving signal line through a resetting signal from the resetting signal line.

Alternatively, the in-cell touch panel further includes control electrodes each corresponding to one touch driving sub-electrode.

Alternatively, the display control module includes a first transistor and a second transistor. A first electrode of the first transistor is connected to the common electrode line, a second electrode thereof is connected to the touch driving sub-electrode, and a gate electrode thereof is connected to the control electrode. A first electrode of the second transistor is connected to one gate line crossing the touch driving sub-electrode, a second electrode thereof is connected to the control electrode, and a gate electrode thereof is connected to the gate line.

Alternatively, the first transistor and the second transistor are both n-type transistors.

Alternatively, the touch control module includes a third transistor and a fourth transistor. A first electrode of the third transistor is connected to the touch driving sub-electrode, a second electrode thereof is connected to the touch driving signal line, and a gate electrode thereof is connected to the control electrode. A first electrode of the fourth transistor is connected to the resetting signal line, a second electrode thereof is connected to the control electrode, and a gate electrode thereof is connected to the resetting signal line.

Alternatively, the third transistor and the fourth transistor are both p-type transistors.

In another aspect, the present disclosure provides in one embodiment a method for driving the above-mentioned in-cell touch panel, including steps of: within each display period, driving a plurality of gate lines arranged horizontally included in the in-cell driving panel sequentially; when driving a gate line crossing a touch driving sub-electrode, controlling the touch driving sub-electrode to be connected to a common electrode line; and when all the gate lines crossing the touch driving sub-electrode have been driven, controlling the touch driving sub-electrode to receive a touch driving signal from a touch driving signal line.

Alternatively, the step of, when driving one gate line crossing the touch driving sub-electrode, controlling the touch driving sub-electrode to be connected to the common electrode line includes, when driving the gate line crossing the touch driving sub-electrode, controlling the gate line to be electrically connected to a control electrode, so as to enable the control electrode to receive a first level and control the touch driving sub-electrode to be electrically connected to the common electrode line, thereby to enable the touch driving sub-electrode to receive a common electrode voltage signal from the common electrode line.

Alternatively, when transistors used in a display control module are n-type transistors, the first level is a high level.

Alternatively, the step of, when all the gate lines crossing the touch driving sub-electrode have been driven, controlling the touch driving sub-electrode to receive the touch driving signal from the touch driving signal line includes, after all the gate lines crossing the touch driving sub-electrode have been driven, outputting a second level by a resetting signal line so as to control the resetting signal line to be electrically connected to the control electrode, control the control electrode to receive the second level and control the touch driving sub-electrode to be electrically connected to the touch driving signal line, thereby to enable the touch driving sub-electrode to receive the touch driving signal from the touch driving signal line; and outputting the first level by the resetting signal line so as to cut off the electrical connection between the resetting signal line and the control electrode.

Alternatively, when transistors used in a touch control module are p-type transistors, the second level is a low level.

In yet another aspect, the present disclosure provides in one embodiment a display device including the above-mentioned in-cell touch panel.

According to the in-cell touch panel, its driving method and the display device in the embodiments of the present disclosure, it is able to perform the display driving and the touch driving simultaneously within each display period, thereby to improve the touch response speed. In addition, through the control electrode, it is able to automatically switch the touch driving sub-electrode between a touch detection stage and a display stage.

DETAILED DESCRIPTION

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

The present disclosure provides in one embodiment an in-cell touch panel, which includes a plurality of gate lines arranged in a first direction, a plurality of touch driving electrodes arranged in a second direction, a plurality of touch driving signal lines and a plurality of common electrode lines. Each touch driving electrode includes N touch driving sub-electrodes, and N is an integer greater than 1. Each touch driving sub-electrodes cross at least one gate line. The in-cell touch panel further includes a resetting signal line, display control modules and touch control modules. Each touch driving sub-electrode is connected to the display control module and the touch control module. The display control module is connected to the gate line crossing each touch driving sub-electrode and configured to, when driving the gate line crossing each touch driving sub-electrode, control the touch driving sub-electrode to be connected to the common electrode line. The touch control module is connected to the resetting signal line and configured to, after all the gate lines crossing each touch driving sub-electrode have been driven, control the touch driving sub-electrode to be connected to the touch driving signal line through a resetting signal from the resetting signal line.

Figure 1:
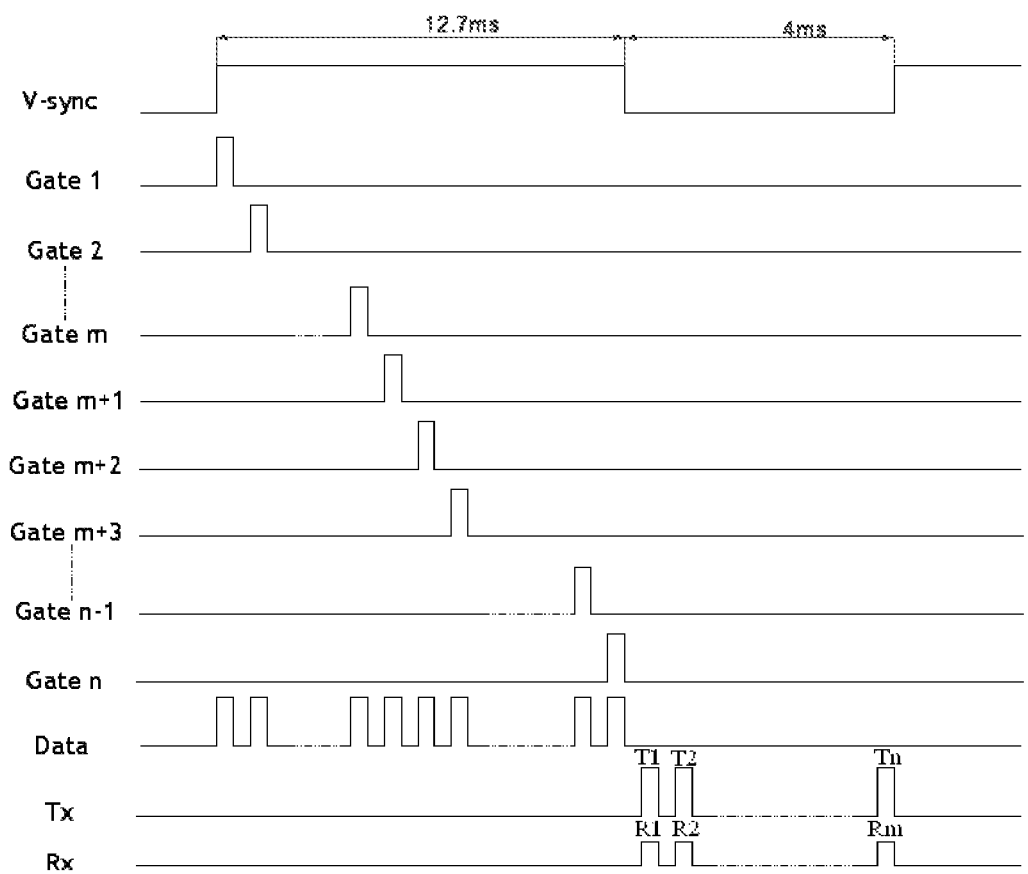
FIG. 1 is a sequence diagram for driving an existing in-cell touch panel.
Figure 2:
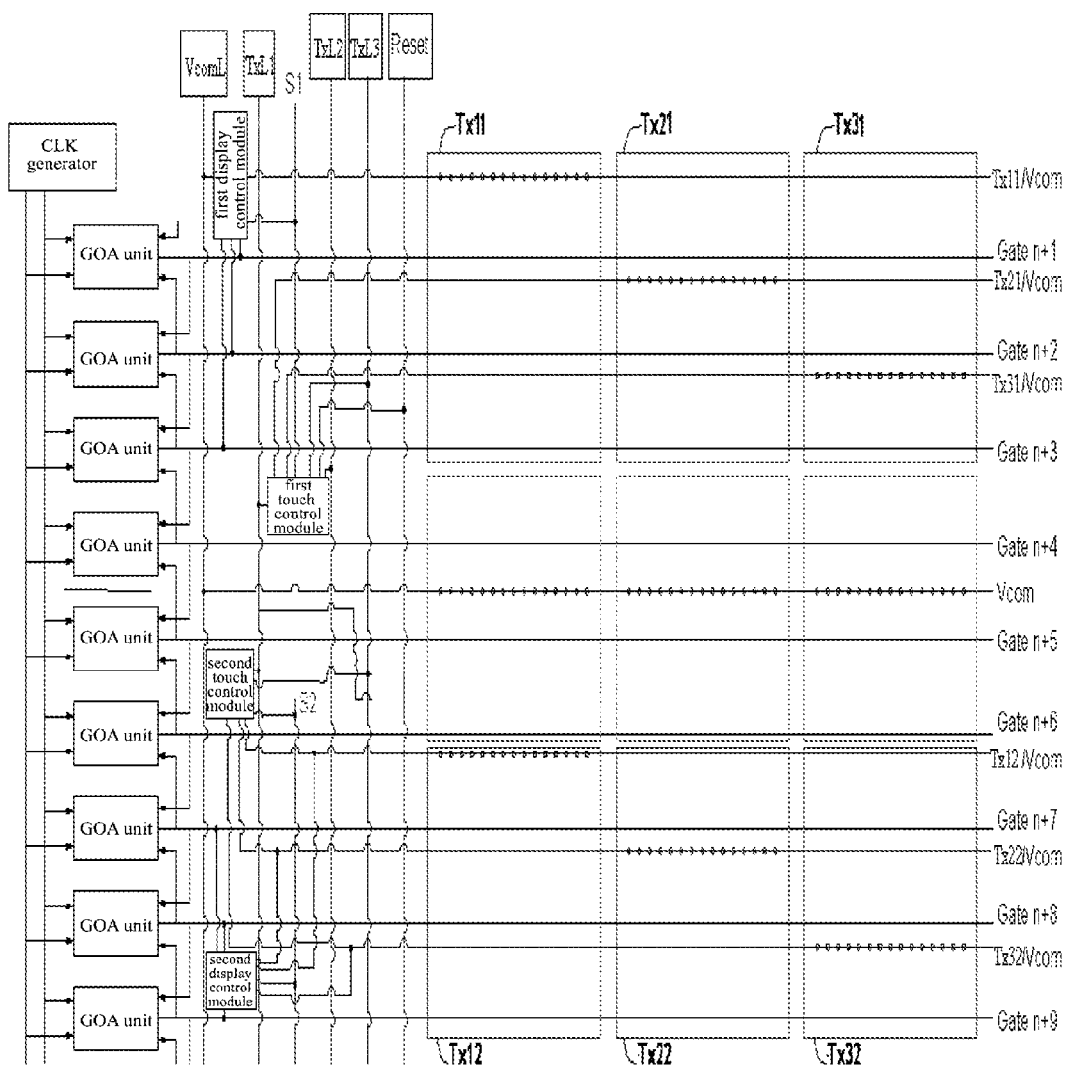
FIG. 2 is a circuit diagram of an in-cell touch panel according to one embodiment of the present disclosure.
Figure 3:
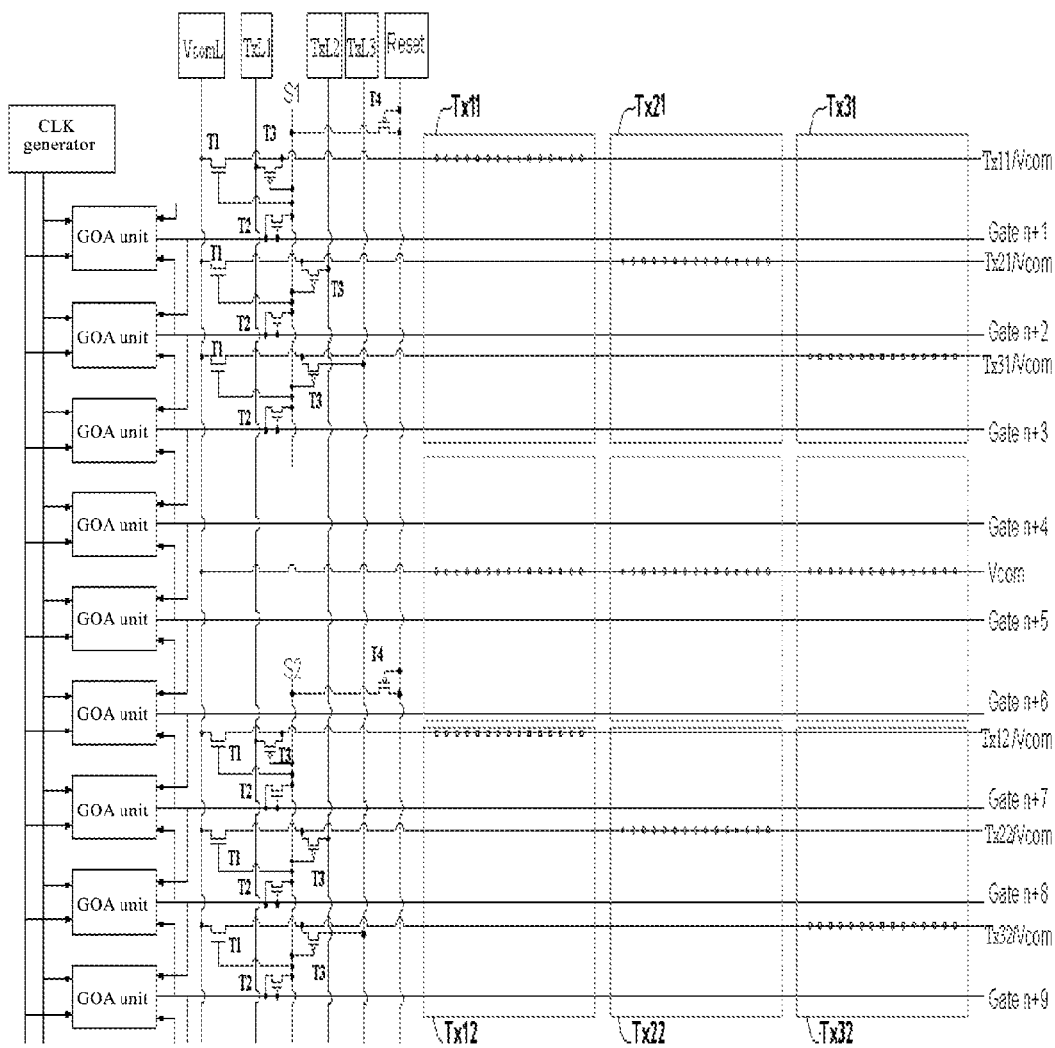
FIG. 3 is another circuit diagram of the in-cell touch panel according to one embodiment of the present disclosure.

The first direction may be a horizontal direction, and the second direction may be a longitudinal direction (as shown in FIGS. 2 and 3). The touch driving signal line may also be the gate line, i.e., the gate line may be used as the touch driving signal line.

According to the in-cell touch panel in the embodiment of the present disclosure, the additional display control modules and touch control modules are provided, so as to, when driving the gate line crossing the touch driving sub-electrode, control the touch driving sub-electrode to be electrically connected to the common electrode line, so that a display stage is started, and after all the gate lines crossing the touch driving sub-electrode have been driven, control the touch driving sub-electrode to be electrically connected to the corresponding touch driving signal line, so that touch detection stage is started. As a result, it is able to perform the display driving and the touch driving simultaneously within each display period, thereby to improve a touch response speed and to automatically switch the touch driving sub-electrode between the touch detection stage and the display stage.

In the in-cell touch panel, each touch driving sub-electrode may be connected to the respective display control module and touch control module. Of course, some touch driving sub-electrodes may not be connected to the display control module or the touch control module, and in this way, the structure in the embodiment of the present disclosure may be used in combination with an existing structure.

To be specific, the in-cell touch panel further includes control electrodes each corresponding to one touch driving sub-electrode.

The display control module includes a first transistor and a second transistor. A first electrode of the first transistor is connected to the common electrode line, a second electrode thereof is connected to the touch driving sub-electrode, and a gate electrode thereof is connected to the control electrode. A first electrode of the second transistor is connected to the gate line crossing the touch driving sub-electrode, a second electrode thereof is connected to the control electrode, and a gate electrode thereof is connected to the gate line.

To be specific, the touch control module includes a third transistor and a fourth transistor. A first electrode of the third transistor is connected to the touch driving sub-electrode, a second electrode thereof is connected to the touch driving signal line, and a gate electrode thereof is connected to the control electrode. A first electrode of the fourth transistor is connected to the resetting signal line, a second electrode thereof is connected to the control electrode, and a gate electrode thereof is connected to the resetting signal line.

The in-cell touch panel will be described hereinafter in conjunction with FIGS. 2 and 3.

As shown in FIG. 2, the in-cell touch panel includes a plurality of gate lines arranged horizontally, i.e., an $(n+1)^{th}$ gate line (Gate n+1), an $(n+2)^{th}$ gate line (Gate n+2), an $(n+3)^{th}$ gate line (Gate n+3), an $(n+4)^{th}$ gate line (Gate n+4), an $(n+5)^{th}$ gate line (Gate n+5), an $(n+6)^{th}$ gate line (Gate n+6), an $(n+7)^{th}$ gate line (Gate n+7), an $(n+8)^{th}$ gate line (Gate n+8) and an $(n+9)^{th}$ gate line (Gate n+9); and three touch driving electrodes arranged longitudinally, i.e., a first touch driving electrode Tx1, a second touch driving electrode Tx2 and a third touch driving electrode Tx3. Each touch driving electrode includes two touch driving sub-electrodes arranged longitudinally, e.g., the first touch driving electrode Tx1 includes a touch driving sub-electrode Tx11 and a touch driving sub-electrode Tx12, the second touch driving electrode Tx2 includes a touch driving sub-electrode Tx21 and a touch driving sub-electrode Tx22, and the third touch driving electrode Tx3 includes a touch driving sub-electrode Tx31 and a touch driving sub-electrode Tx32.

The in-cell touch panel further includes common electrodes Vcom each horizontally arranged between two adjacent touch driving sub-electrodes and connected to a common electrode line. Each touch driving sub-electrode and each common electrode cross three grate lines, i.e., Tx11, Tx21 and Tx31 each cross Gate n+1, Gate n+2 and Gate n+3, the common electrodes Vcom cross Gate n+4, Gate n+5 and Gate n+6, and Tx12, Tx22 and Tx33 each intersect Gate n+7, Gate n+8 and Gate n+9.

The in-cell touch panel further includes a resetting signal line Reset, a first control electrode S1 and a second control electrode S2. The first touch driving electrode corresponds to a first touch driving signal line TxL1, the second touch driving electrode corresponds to a second touch driving signal line TxL2, and the third touch driving electrode corresponds to a third touch driving signal line TxL3.

The in-cell touch panel further includes a first display control module, a second display control module, a first touch control module and a second touch control module.

The first display control module is connected to S1, Gate n+1, Gate n+2, Gate n+3, Tx11, Tx21, Tx31 and VcomL, and configured to, when scanning Gate n+1, Gate n+2 or Gate n+3, control S1 to receive a gate driving signal on Gate n+1, Gate n+2 or Gate n+3, so as to control VcomL to be electrically connected to Tx11, control VcomL to be electrically connected to Tx21 and control VcomL to be electrically connected to Tx31. The first touch control module is connected to Reset, S1, Tx11, Tx21, Tx31, TxL1, TxL2 and TxL3, and configured to, after scanning Gate n+3, control Reset to transmit a resetting signal to S1, so as to control TxL1 to be electrically connected to Tx11, control TxL2 to be electrically connected to Tx21 and control TxL3 to be electrically connected to Tx31.

The second display control module is connected to S2, Gate n+7, Gate n+8, Gate n+9, Tx12, Tx22, Tx32 and VcomL, and configured to, when scanning Gate n+7, Gate n+8 or Gate n+9, control S1 to receive a gate driving signal on Gate n+7, Gate n+8 or Gate n+9, so as to control VcomL to be electrically connected to Tx12, control VcomL to be electrically connected to Tx22 and control VcomL to be electrically connected to Tx32. The second touch control module is connected to Reset, S2, Tx12, Tx22, Tx32, TxL1, TxL2 and TxL3, and configured to, after scanning Gate n+9, control Reset to transmit a resetting signal to S2, so as to control TxL1 to be electrically connected to Tx12, control TxL2 to be electrically connected to Tx22, and control TxL3 to be electrically connected to Tx32.

In FIG. 2, gate-on-array (GOA) units in each row are connected to the gate line in a current row, the gate line in a previous row and the gate line in a next row, respectively, and a clock signal (CLK) generator is configured to provide a first clock signal CLKA and a second clock signal CLKB with a phase reverse to the first clock signal CLKA to the respective GOA unit. In addition, in FIG. 2, n may be 0 or a positive integer.

As shown in FIG. 3, the in-cell touch panel includes a plurality of gate lines arranged horizontally, i.e., an $(n+1)^{th}$ gate line (Gate n+1), an $(n+2)^{th}$ gate line (Gate n+2), an $(n+3)^{th}$ gate line (Gate n+3), an $(n+4)^{th}$ gate line (Gate n+4), an $(n+5)^{th}$ gate line (Gate n+5), an $(n+6)^{th}$ gate line (Gate n+6), an $(n+7)^{th}$ gate line (Gate n+7), an $(n+8)^{th}$ gate line (Gate n+8) and an $(n+9)^{th}$ gate line (Gate n+9); and three touch driving electrodes arranged longitudinally, i.e., a first touch driving electrode Tx1, a second touch driving electrode Tx2 and a third touch driving electrode Tx3. Each touch driving electrode includes two touch driving sub-electrodes arranged longitudinally, e.g., the first touch driving electrode Tx1 includes a touch driving sub-electrode Tx11 and a touch driving sub-electrode Tx12, the second touch driving electrode Tx2 includes a touch driving sub-electrode Tx21 and a touch driving sub-electrode Tx22, and the third touch driving electrode Tx3 includes a touch driving sub-electrode Tx31 and a touch driving sub-electrode Tx32.

The in-cell touch panel further includes common electrodes Vcom each horizontally arranged between two adjacent touch driving sub-electrodes and connected to a common electrode line. Each touch driving sub-electrode and each common electrode cross three grate lines, i.e., Tx11, Tx21 and Tx31 each cross Gate n+1, Gate n+2 and Gate n+3, the common electrodes Vcom cross Gate n+4, Gate n+5 and Gate n+6, and Tx12, Tx22 and Tx33 each cross Gate n+7, Gate n+8 and Gate n+9.

The in-cell touch panel further includes a resetting signal line Reset, a first control electrode S1 and a second control electrode S2. Tx11 is connected to a first touch driving signal line TxL1 through a third transistor T3, a gate electrode of which is connected to the first control electrode S1, and to a common electrode line VcomL through a first transistor T1, a gate electrode of which is connected to the first control electrode S1.

Tx21 is connected to a second touch driving signal line TxL2 through a third transistors T3, a gate electrode of which is connected to the first control electrode S1, and to the common electrode line VcomL through a first transistors T1, a gate electrode of which is connected to the first control electrode S1. Tx31 is connected to a third touch driving signal line TxL3 through a third transistors T3, a gate electrode of which is connected to the first control electrode S1, and to the common electrode line VcomL through a first transistors T1, a gate electrode of which is connected to the first control electrode S1. Gate n+1 is connected to the first control electrode S1 through a second transistors T2, a gate electrode of which is connected to Gate n+1. Gate n+2 is connected to the first control electrode S1 through a second transistors T2, a gate electrode of which is connected to Gate n+2. Gate n+3 is connected to the first control electrode S1 through a second transistors T2, a gate electrode of which is connected to Gate n+3. Reset is connected to the first control electrode S1 through a fourth transistors T4, a gate electrode of which is connected to Reset. Tx12 is connected to the first touch driving signal line TxL1 through a third transistors T3, a gate electrode of which is connected to the second control electrode S2, and to the common electrode line VcomL through a first transistors T1, a gate electrode of which is connected to the second control electrode S2. Tx22 is connected to the second touch driving signal line TxL2 through a third transistors T3, a gate electrode of which is connected to the second control electrode S2, and to the common electrode line VcomL through a first transistors T1, a gate electrode of which is connected to the second control electrode S2. Tx32 is connected to the third touch driving signal line TxL3 through a third transistors T3, a gate electrode of which is connected to the second control electrode S2, and to the common electrode line VcomL through a first transistors T1, a gate electrode of which is connected to the second control electrode S2. Gate n+7 is connected to the second control electrode S2 through a second transistors T2, a gate electrode of which is connected to Gate n+7. Gate n+8 is connected to the second control electrode S2 through a second transistors T2, a gate electrode of which is connected to Gate n+8. Gate n+9 is connected to the second control electrode S2 through a second transistors T2, a gate electrode of which is connected to Gate n+9. Reset is connected to the second control electrode S2 through a fourth transistors T4, a gate electrode of which is connected to Reset.

In FIG. 3, GOA units in each row are connected to the gate line in a current row, the gate line in a previous row and the gate line in a next row, respectively, and a clock signal (CLK) generator is configured to provide a first clock signal CLKA and a second clock signal CLKB with a phase reverse to the first clock signal CLKA to the respective GOA unit. In addition, in FIG. 3, n may be 0 or a positive integer.

During the implementation, the first transistors T1 and the second transistors T2 are n-type transistors, and the third transistors T3 and the fourth transistors T4 are p-type transistors.

Figure 4:
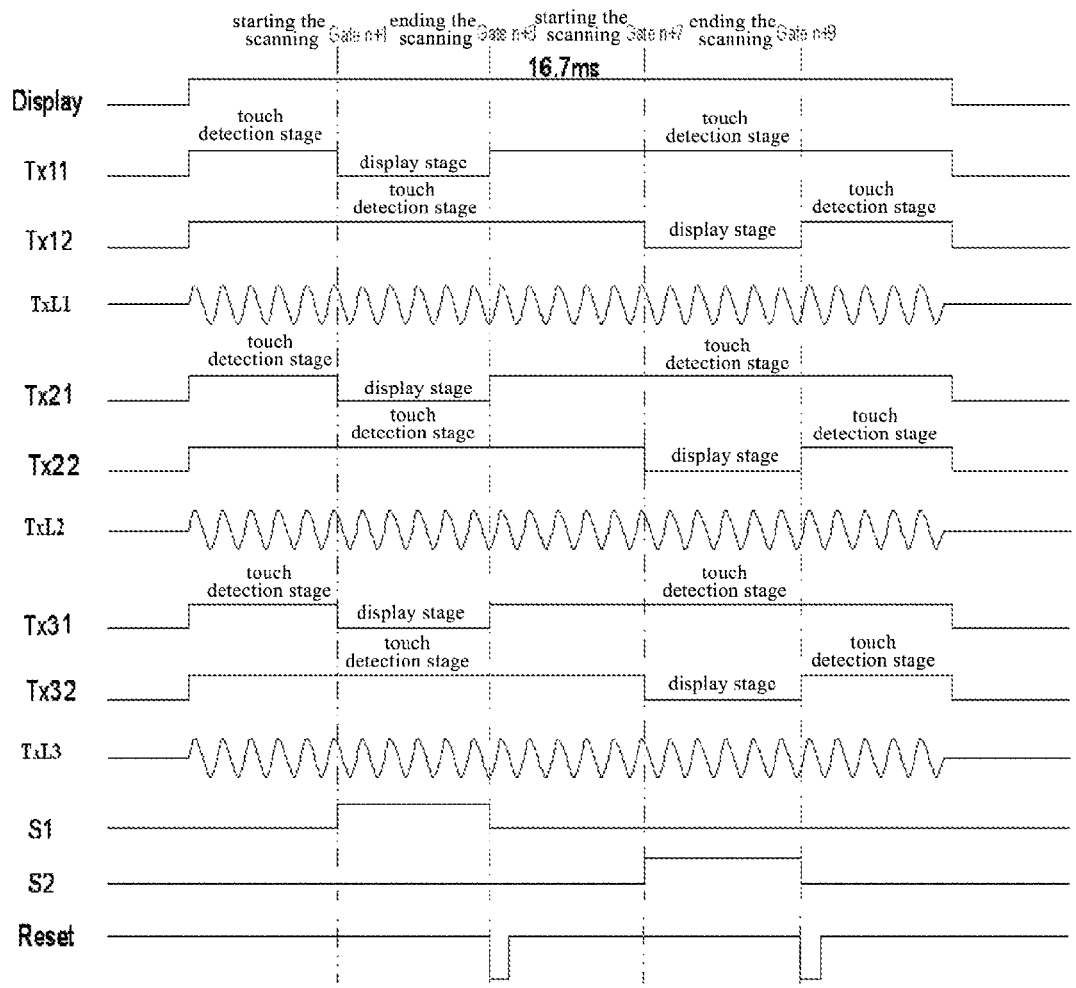
FIG. 4 is a sequence diagram for achieving a touch function of the in-cell touch panel according to one embodiment of the present disclosure.

As shown in FIG. 4, which is a sequence diagram of the in-cell touch panel for achieving the touch function, during the operation of the in-cell touch panel (where one frame includes 16.7 ms), when Gate n+1, Gate n+2 and Gate n+3 are driven sequentially, Reset outputs a high level and it is connected to the first control electrode S1 through a p-type TFT, so at this time, no influence is imposed by the resetting signal from Reset on the first control electrode S1.

When Gate n+1, Gate n+2 and Gate n+3 are driven sequentially, a signal from Gate n+1, a signal from Gate n+2 and a signal from Gate n+3 are inputted in a time-division manner into the first control electrode S1, so the first control electrode S1 outputs a high level so as to stop the input of a signal from the first touch driving signal line TxL1 into Tx11. At this time, the common electrode voltage signal may be inputted into Tx11, so Tx11 is used for the display stage rather than the touch detection stage. Identically, Tx21 and Tx31 may also be used for the display stage rather than the touch detection stage.

After Gate n+3 has been driven, a low level signal may be applied by Reset to the first control electrode S1, and then a first touch driving signal from the first touch driving signal line TxL1, a second touch driving signal from the second touch driving signal line TxL2 and a third touch driving signal from the third touch driving signal line TxL3 are applied synchronously to Tx11, Tx21 and Tx31, respectively, so Tx11, Tx21 and Tx31 are used for the touch detection stage again. The common electrode voltage signal is applied to the common electrode continuously through the common electrode line.

When driving Gate n+7, Gate n+8 and Gate n+9 sequentially, Reset outputs a high level and it is connected to the second control electrode S2 through a p-type TFT, so at this time, no influence is imposed by the resetting signal from Reset on the second control electrode S2.

When driving Gate n+7, Gate n+8 and Gate n+9 sequentially, a signal from Gate n+7, a signal from Gate n+8 and a signal from Gate n+9 are inputted in a time-division manner into the second control electrode S2, so the second control electrode S2 outputs a high level so as to stop the input of a signal from the second touch driving signal line TxL1 into Tx12. At this time, the common electrode voltage signal may be inputted into Tx12, so Tx12 is used for the display stage. Identically, Tx22 and Tx32 may also be used for the display stage rather than the touch detection stage.

When Gate n+9 has been driven, a low level signal may be applied by Reset to the second control electrode S2, and then the first touch driving signal from the first touch driving signal line TxL1, the second touch driving signal from the second touch driving signal line TxL2 and the third touch driving signal from the third touch driving signal line TxL3 are applied synchronously to Tx12, Tx22 and Tx32, respectively, so Tx12, Tx22 and Tx32 are used for the touch detection stage again.

As shown in FIG. 4, the first touch driving signal line TxL1 continuously outputs the first touch driving signal, the second touch driving signal line TxL2 continuously outputs the second touch driving signal, and the third touch driving signal line TxL3 continuously outputs the third touch driving signal.

Referring to FIG. 4, during the operation, it is able for the in-cell touch panel in the embodiments of the present disclosure to perform the display driving and the touch driving simultaneously within one frame, i.e., 16.7 ms, so as to improve the touch response speed. In addition, through the control electrodes, it is able to automatically switch the touch driving sub-electrode between the touch detection stage and the display stage.

The present disclosure further provides in one embodiment a method for driving the above-mentioned in-cell touch panel, which includes steps of: within each display period, driving a plurality of gate lines arranged horizontally included in the in-cell touch panel sequentially; when driving the gate line crossing the touch driving sub-electrode, controlling the touch driving electrode to be connected to the common electrode line; and when all the gate lines crossing the touch driving sub-electrode have been driven, controlling the touch driving sub-electrode to receive the touch driving signal from the touch driving signal line.

To be specific, the step of, when driving the gate line crossing the touch driving sub-electrode, controlling the touch driving sub-electrode to be connected to the common electrode line may include, when driving the gate line crossing the touch driving sub-electrode, controlling the second transistor connected between the gate line and the control electrode to be On, so as to enable the control electrode to receive the first level and control the first transistor connected between the touch driving sub-electrode and the common electrode line, thereby to enable the touch driving sub-electrode to receive the common electrode voltage signal from the common electrode line.

To be specific, when the first transistors and the second transistors are n-type transistors, the first level may be a high level.

To be specific, the step of, when all the gate lines crossing the touch driving sub-electrode have been driven, controlling the touch driving sub-electrode to receive the touch driving signal from the touch driving signal line may include, after all the gate lines crossing the touch driving sub-electrode have been driven, outputting the second level by the resetting signal line so as to control the fourth transistor connected between the resetting signal line and the control electrode to be On, control the control electrode to receive the second level and control the third transistor connected between the touch driving sub-electrode and the touch driving signal line to be On, thereby to enable the touch driving sub-electrode to receive the touch driving signal from the touch driving signal line; and outputting the first level by the resetting signal line so as to cut off the electrical connection between the resetting signal line and the control electrode.

During the implementation, when the third transistors and the fourth transistors are p-type transistors, the second level may be a low level.

The present disclosure further provides in one embodiment a display device including the above-mentioned in-cell touch panel. The display device may be a liquid crystal display, a liquid crystal TV, an organic light-emitting diode (OLED) panel, an OLED display, an OLED TV or an electronic paper.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. An in-cell touch panel, comprising a plurality of gate lines arranged in a first direction, a plurality of touch driving electrodes arranged in a second direction, a plurality of touch driving signal lines and a plurality of common electrode lines, each touch driving electrode comprising a plurality of touch driving sub-electrodes, the touch driving sub-electrodes crossing multiple gate lines, wherein:
the in-cell touch panel further comprises a resetting signal line, a display control circuit, a touch control circuit, and control electrodes;
each touch driving sub-electrode is connected to the display control circuit and the touch control circuit;
the display control circuit is connected to gate lines crossing each touch driving sub-electrode and configured to, when driving the gate lines crossing each touch driving sub-electrode, control the touch driving sub-electrode to be connected to the common electrode line; and
the touch control circuit is connected to the resetting signal line and configured to, after all the gate lines crossing each touch driving sub-electrode have been driven, control the touch driving sub-electrode to be connected to the touch driving signal line through a resetting signal from the resetting signal line;
each control electrode corresponds to one touch driving sub-electrode;
the display control circuit comprises a first transistor and a second transistor;
a first electrode of the first transistor is connected to the common electrode line, a second electrode of the first transistor is connected to the touch driving sub-electrode, and a gate electrode of the first transistor is connected to the control electrode: and
a first electrode of the second transistor is connected to a gate line crossing the touch driving sub-electrode, a second electrode of the second transistor is connected to the control electrode, and a gate electrode of the second transistor is connected to the gate line.

2. The in-cell touch panel according to claim 1, wherein the first transistor and the second transistor are both n-type transistors.

3. The in-cell touch panel according to claim 1, wherein:
the touch control circuit comprises a third transistor and a fourth transistor;
a first electrode of the third transistor is connected to the touch driving sub-electrode, a second electrode of the third transistor is connected to the touch driving signal line, and a gate electrode of the third transistor is connected to the control electrode; and
a first electrode of the fourth transistor is connected to the resetting signal line, a second electrode of the fourth transistor is connected to the control electrode, and a gate electrode of the fourth transistor is connected to the resetting signal line.

4. The in-cell touch panel according to claim 3, wherein the third transistor and the fourth transistor are both p-type transistors.

5. A method for driving the in-cell touch panel according to claim 1, comprising steps of:
within each display period, driving a plurality of gate lines arranged horizontally in the in-cell touch panel sequentially;
in response to driving a gate line crossing a touch driving sub-electrode, controlling the touch driving sub-electrode to be connected to a common electrode line; and
in response to all the gate lines crossing the touch driving sub-electrode having been driven, controlling the touch driving sub-electrode to receive a touch driving signal from a touch driving signal line.

6. The method according to claim 5, wherein the step of, in response to driving a gate line crossing the touch driving sub-electrode, controlling the touch driving sub-electrode to be connected to the common electrode line includes, in response to driving the gate line crossing the touch driving sub-electrode, controlling the gate line to be electrically connected to a control electrode, so as to enable the control electrode to receive a first level and control the touch driving sub-electrode to be electrically connected to the common electrode line, thereby to enable the touch driving sub-electrode to receive a common electrode voltage signal from the common electrode line.

7. The method according to claim 6, wherein:
the display control circuit includes n-type transistors, and the first level is a high level.

8. The method according to claim 7, wherein the step of, in response to all the gate lines crossing the touch driving sub-electrode having been driven, controlling the touch driving sub-electrode to receive the touch driving signal from the touch driving signal line includes, after all the gate lines crossing the touch driving sub-electrode have been driven, outputting a second level by a resetting signal line so as to control the resetting signal line to be electrically connected to the control electrode, control the control electrode to receive the second level and control the touch driving sub-electrode to be electrically connected to the touch driving signal line, thereby to enable the touch driving sub-electrode to receive the touch driving signal from the touch driving signal line; and outputting the first level by the resetting signal line so as to cut off the electrical connection between the resetting signal line and the control electrode.

9. The method according to claim 6, wherein the step of, in response to all the gate lines crossing the touch driving sub-electrode having been driven, controlling the touch driving sub-electrode to receive the touch driving signal from the touch driving signal line includes, after all the gate lines crossing the touch driving sub-electrode have been driven, outputting a second level by the resetting signal line so as to control the resetting signal line to be electrically connected to the control electrode, control the control electrode to receive the second level and control the touch driving sub-electrode to be electrically connected to the touch driving signal line, thereby to enable the touch driving sub-electrode to receive the touch driving signal from the touch driving signal line; and outputting the first level by the resetting signal line so as to cut off the electrical connection between the resetting signal line and the control electrode.

10. The method according to claim 9, wherein:
the touch control circuit includes p-type transistors, and the second level is a low level.

11. A display device comprising the in-cell touch panel according to claim 1.

12. The display device according to claim 11, wherein the first transistor and the second transistor are both n type transistors.

13. The display device according to claim 12, wherein:
the touch control circuit comprises a third transistor and a fourth transistor;
a first electrode of the third transistor is connected to the touch driving sub-electrode, a second electrode of the third transistor is connected to the touch driving signal line, and a gate electrode of the third transistor is connected to the control electrode; and
a first electrode of the fourth transistor is connected to the resetting signal line, a second electrode of the fourth transistor is connected to the control electrode, and a gate electrode of the fourth transistor is connected to the resetting signal line.

14. The display device according to claim 11, wherein:
the touch control circuit comprises a third transistor and a fourth transistor;
a first electrode of the third transistor is connected to the touch driving sub-electrode, a second electrode of the third transistor is connected to the touch driving signal line, and a gate electrode of the third transistor is connected to the control electrode; and
a first electrode of the fourth transistor is connected to the resetting signal line, a second electrode of the fourth transistor is connected to the control electrode, and a gate electrode of the fourth transistor is connected to the resetting signal line.

15. The display device according to claim 14, wherein the third transistor and the fourth transistor are both p-type transistors.

16. The in-cell touch panel according to claim 1, wherein:
the touch control circuit comprises a third transistor and a fourth transistor;
a first electrode of the third transistor is connected to the touch driving sub-electrode, a second electrode of the third transistor is connected to the touch driving signal line, and a gate electrode of the third transistor is connected to the control electrode; and
a first electrode of the fourth transistor is connected to the resetting signal line, a second electrode of the fourth transistor is connected to the control electrode, and a gate electrode of the fourth transistor is connected to the resetting signal line.

* * * * *